(12) United States Patent
Liscano et al.

(10) Patent No.: US 7,412,522 B2
(45) Date of Patent: Aug. 12, 2008

(54) SYSTEM AND METHOD FOR FACILITATING COMMUNICATION USING PRESENCE AND COMMUNICATION SERVICES

(75) Inventors: Ramiro Liscano, Nepean (CA); Natalia Balaba, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 949 days.

(21) Appl. No.: 10/631,789

(22) Filed: Aug. 1, 2003

(65) Prior Publication Data

US 2004/0037271 A1    Feb. 26, 2004

(30) Foreign Application Priority Data

Aug. 12, 2002   (GB) ................................. 0218711.0

(51) Int. Cl.
    *G06F 15/173* (2006.01)
(52) U.S. Cl. .................................................... 709/227
(58) Field of Classification Search ................. 709/227, 709/203, 217, 223
    See application file for complete search history.

(56) References Cited

U.S. PATENT DOCUMENTS

| | | | |
|---|---|---|---|
| 7,035,923 B1 * | 4/2006 | Yoakum et al. ............. 709/224 |
| 7,050,810 B2 * | 5/2006 | Brusilovsky et al. ......... 455/445 |
| 7,139,797 B1 * | 11/2006 | Yoakum et al. .............. 709/204 |
| 7,149,701 B2 * | 12/2006 | McKinney ...................... 705/8 |
| 7,162,474 B1 * | 1/2007 | Harker et al. ................... 707/9 |
| 7,197,565 B2 * | 3/2007 | Abdelaziz et al. ........... 709/226 |
| 7,206,388 B2 * | 4/2007 | Diacakis ................... 379/88.03 |
| 7,219,153 B1 * | 5/2007 | Day ............................ 709/229 |
| 2002/0065894 A1 | 5/2002 | Dalal et al. |

FOREIGN PATENT DOCUMENTS

| WO | WO 98/51064 A | 11/1998 |
|---|---|---|
| WO | WO 01/45342 A2 | 6/2001 |
| WO | WO 01/69406 | 9/2001 |

OTHER PUBLICATIONS

Rosenberg, J. e t a l: "d raft-rosenberg-sip-pip-00.txt: S IP F or P resence", I ETF Internet Draft, Nov. 13, 1998, pp. 1-22, XP002325320.

Guttman, E. et al: "Service Location Protocol, Version 2", Network Working Group, RFC 2608, Jun. 1999, XP002191158 Sections 4,5.

* cited by examiner

*Primary Examiner*—David Y Eng

(57) ABSTRACT

A method for facilitating communication with a user. The method comprises the steps of: receiving contact information for the user, from a presence service; checking to determine if a particular communication service is supported by the user; checking to determine if the contact address of the user is accessible; launching at least one of an appropriate helper application and objects; and initiating communication with the user through the particular communication service.

29 Claims, 4 Drawing Sheets

US 7,412,522 B2

SYSTEM AND METHOD FOR FACILITATING COMMUNICATION USING PRESENCE AND COMMUNICATION SERVICES

FIELD OF INVENTION

The present invention relates to communication systems and more particularly to a system for facilitating communication using separate presence and communication services.

BACKGROUND OF THE INVENTION

Presence services are primarily used for providing "availability" information of one user to another user of a system. This "availability" information includes an indication of desire and availability or willingness of the user to engage in immediate communication. In order to achieve immediate communication a Presence Service is used to convey contact information to a user's presence client and the presence client is required to use that information to determine how to connect the users. This is particularly difficult when the communication services are developed by a third party vendor. Communication services include any application that creates a communication path between two or more parties. Examples of such services include telephone voice connections, Instant Messaging, chat, video conferencing, and sharing of presentations.

Existing Presence, or Instant Messaging (IM), services rely on a fixed and a built-in set of communication connection aids. For example, in order to enable communication via instant messaging services such as MSN and AOL, the communication service is normally tightly coupled with the presence service. These communication services are developed by the same vendor and usually pass through the IM server.

The prior art suffers inherent disadvantages because they are "closed" systems. There is no flexible way to add other telephony or communication services to these systems. For example, the existing Instant Messaging systems cannot add a non-IP phone call set via third party voice products. The communication connections of these systems are hardwired and limited. While this may be suitable for IM chat style of communication services, it is not suitable for other communication services, for example, existing telephony services.

Several standard bodies are attempting to define how contact information is conveyed with a user's availability in a presence framework. Of particular interest is the IETF Instant Message and Presence Protocol (IMPP) set forth in "A Model for Presence and Instant Messaging", M. Day, J. Rosenberg, and H. Sugano, IETF RFC 2778, February 2000. Two further IETF documents discuss the Common Profile for Instant Messaging (CPIM). These two documents are the Common Presence and Instant Messaging: Message Format document (Common Presence and Instant Messaging: Message Format <draft-ietf-impp-cpim-msgfmt-03.txt>) and the CPIM Presence Information Data Format (CPIM Presence Information Data Format <draft-ietf-impp-cpim-pidf-00.txt>).

The Common Presence and Instant Messaging: Message Format document defines a mime content-type 'message/cpim' object which is a multipart entity. This document defines the structure of an IM message specifying mandatory fields such as "From:", "To:", "Date:", "Subject:", etc. The second document, CPIM Presence Information Data, defines the actual contact information that a presence client receives in order to enable a communication session between two users of a presence service. This document does not discuss how a presence client uses contact information for launching third party communication applications.

There is no flexible way to enhance any existing Presence (or Availability) Service to handle communication connection via third party communication products.

SUMMARY OF THE INVENTION

In accordance with the present invention, a system is provided for facilitating communication through separation between the presence and communication components. The system is based on the exchange of availability messages that are not based on the mime format, and which contain information for proper presence service functioning. Preferably, the system adopts the SLP service definition format and provides a method for a presence client to use contact information for launching third party communication applications.

Therefore, in accordance with the present invention, there is provided an approach and protocol to allow a Presence service to employ third party communication services to handle communication connection after a user's availability is established.

Advantageously, the present invention enables a Presence Service to deploy any number of communication mediums to create a communication path, including, for example, different Instant Messaging providers to send instant messages.

BRIEF DESCRIPTION OF THE DRAWINGS

The present invention will be described in detail with reference to the accompanying drawings, in which like numerals denote like parts, and in which.

DETAILED DESCRIPTION

A presence service generally offers two types of information, including projection of availability and communication contact information. Projection of availability includes the user's availability information and is an indication of the person's desire or willingness for communication. The availability information is projected, or conveyed, to other users. A user appears available if that user is willing to communicate. Otherwise, the user appears unavailable.

Communication contact information includes information used for connecting with a user, such as how, where or by what means a user is available for communication. The contact information describes different communication service types on which the user is available at that time. Such communication types include telephony, Instant Messaging, chat, video streaming, etc.

Figure 1:
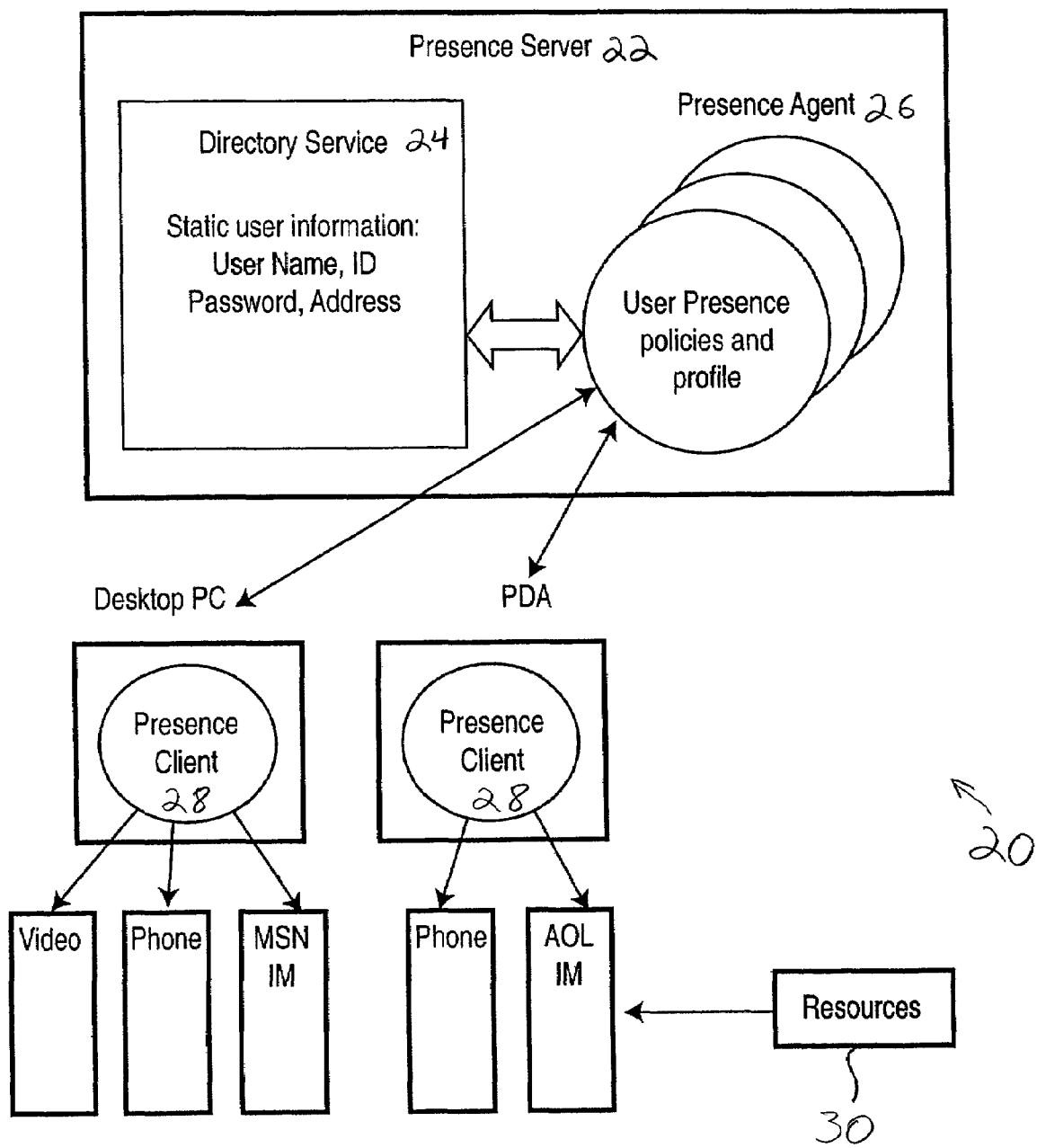
FIG. 1 is a block diagram of a communication system according an embodiment of the present invention.

The following is an example of how a presence client registers and receives availability information. This example is provided in order to give a better understanding of the mechanism by which the presence service projects a user's availability and is provided solely for the purpose of illustration. Referring to FIG. 1, a presence system according to an embodiment of the present invention is indicated generally by the numeral 20. The presence system includes a presence server 22 which runs the presence service which includes a directory service 24 and a presence agent 26, a presence client 28 and resources 30, as will be described in more detail below.

The presence server 22 is a server that allows users to publish their availability to communicate to other users. The presence service on the presence server 22 includes a directory service 24 and a presence agent 26. A user registration procedure is targeted primarily to the directory service 24, while a user log-in procedure is performed on the presence agent 26. Procedures such as user registration and user log-in are two distinct operations.

The directory service 24 is static data storage for storing a data record in association with each user. The data record includes static information about the user including, for example, name, ID, password, address, etc. The directory service 24 allows authorized access to the system from applications other than the presence service on the presence server 22.

The presence agent 26 is an entity within the presence server 22 that is associated with one individual user. The presence agent 26 is responsible for storage and management of user defined presence policies, and a user profile. The presence policies are used to determine the acceptance of "Subscription" requests from other presence agents that want to view the availability of the individual user and to control when availability notifications are to be sent to those presence agents already subscribed. It maintains contact and user state information that is projected to those users subscribed to the individual user's presence. Communication between the user and presence agents 26 is enabled via presence clients 28.

The presence client 28 is a platform specific software entity that resides on an individual device and operates as a user interface to the presence server 22. There can exist several presence clients for an individual user. The presence client 28 facilitates communication between the user and the associated presence agent 26. This communication includes, for example, subscription and notification policies, resource contact information, user role, relationship, and buddy list management, as discussed in greater detail with reference to applicant's copending application filed on the same day as this application and entitled "Architecture and Implementation for Control of Context Aware Call Processing with Local Feature Definition". The login procedure is used to authenticate a client in order for the client to obtain permission for such communication.

A resource 30 is an entity that represents a communication identification and communication service. A resource can be activated/deactivated, added, removed or modified. The system 20 generally includes more than one resource 30 and each resource 30 has an associated resource profile. The resource profile includes a resource identification, an indication of whether or nor the resource is active and a communication address. An exemplary resource profile for a desktop phone is listed below.

```
<resource_profile
    id='desktop phone'
    active='inactive'
    service_url='service:telephony:tel/E164/4567;phone-context=+16135922122'/>
```

When a new resource 30 is added, the presence client 28 discovers the resource profile of the resource 30 and sends a-request to add this resource to the presence agent 26. Once added, the resource 30 can be activated by sending the appropriate request to the presence agent 26. The resource activation procedure triggers the user's current presence policies and publishes the user's availability to other presence agents 26.

A user that requests to view another user's availability is referred to herein as a watcher while the user being watched is referred to as a presentity. These definitions conform to the definitions used by the IETF IMPP model discussed above. A watcher issues a subscription request to the presence server 22 in order to determine the availability of a presentity. The subscription request includes both the presentity's and the watcher's identity as well as a presentity role discussed in greater detail in applicant's co-pending application filed on the same day as this application and entitled "Role-Based Presence Enabled Service for Communication System". An exemplary XML description of the subscription request or "subscribe" message is included below. It will be understood that messages in the system 20 are referred to as events of particular types. Thus, the subscribe message is an event of type "subscribe".

```
type=subscribe
    originator=watcher@domain.com
    receiver=presentity@domain.com
role=role/>
```

After issuing a subscribe message, the watcher receives one of the following two replies.

| Positive Reply | Negative Reply |
|---|---|
| <reply | <reply |
|    event=subscribe |    event=subscribe |
|    from=presentity@domain.com |    from=presentity@domain.com |
|    to=watcher@domain.com |    to=watcher@domain.com |
|    value=success |    value=failed |
| role=role | role=role |
|    key=key/> |    reason=string/ |

These replies include "role" and "key" tags. The role tag is used to define the role that the presentity must be in, in order for the watcher to receive a notification of the presentity's availability. The key tag is used as a mechanism for identifying the appropriate presentity's availability for a particular subscription request.

A "notify" event is used for notification of a presentity's availability. The notify event is summarized below.

```
<event
    type=notify         /* Event type */
    originator=key      /* Originator identified using key value */
value=yes | no | cancel /* Presentity's availability */
status=status>          /* Presentity's status */
    <resource_profile id='id' service_url='service_url'/>/* List of media service URLs*/
    <resource_profile id='id' service_url='service_url'/>
    <resource_profile id='id' service_url='service_url'/>
</event>
```

The notify event is posted if the user's presence policies for notification are triggered positively. A user's notification presence policies are triggered by changes in the user's state, location, and activation a resource. It will be understood that three availability status values are available, including "yes" for available, "no" for unavailable, or "cancel" for the cancellation of the subscription request. The contact information for the presentity is represented using a service_url. For the present embodiment, the service_url is the URL service scheme as defined by the IETF Service Locator Protocol (SLP), as dicussed in "Service Location Protocol for Enterprise Networks", J. Kempf and P. St. Pierre, 1999, and further disclosed in the IETF document CPIM Presence Information Data Format (CPIM Presence Information Data Format <draft-ietf-impp-cpim-pidf-00.txt>).

Those of skill in the art will understand the SLP service scheme and thus, only an overview is presented herein. The SLP service scheme defines a service URL as follows:

service_url="service:" service-type ":" service-access-info"

The service-type allows for the specification of service abstract types and particular recognized URL scheme names like http, ftp, telnet, etc. Some examples of this include "service:lpr:", "service:http:", "service:ftp:", "service:chat:". Service types can utilize a generic service name as well as the specific service name to help the user understand the URL. For example, the generic service type "printer" can be used to represent a series of protocols that relate to communication with a printer. The service in this case can be specified using "service:printer:lpr".

The service-access-info describes how the associated service is to be accessed. This includes information regarding how a user is to be contacted. Service access information consists of the following format:

service-access-info="/" address-family '/' address-spec ["/" [url-path] [";" attribute-list]]

The address-family indicates the network layer. For example "//" indicates an IP address. The address specification is the address used for communication with the presentity. A url-path is protocol-specific and specifies details regarding the manner of accessing the service. Similar to the attributes, this is an optional item. Attributes are specified in the following manner: attribute-id "=" value.

The following is a set of examples of typical IP-based service types that a presentity projects to watchers.
service:IM:ICQ//[host:port]/uin@icq.aol.com;version=1.2
service:chat:IRC//betty_roland@kanata.mitel.com;version=2.3
service:http//webset2100@mitel.com;version=1.0

A non-IP protocol can also be specified for a service such as a telephony service using the SLP format (e.g. a telephony service based on the IETF RFC2806 report on URLs for Telephone Calls). The phone context allows a presence client to determine how to make a call based on the client's location context. The example provided below shows a particular example of a phone number 4567. This phone number is a local number and therefore is only available if the user is the 16135922122 number code: service:telephony:tel/E164/4567;phone-context=+16135922122

Using SLP, these services are defined using a service template and are registered with the Internet Assigned Numbers Authority (IANA) to represent the service media type.

Launching $3^{rd}$ Party Communication Applications

Figure 2:
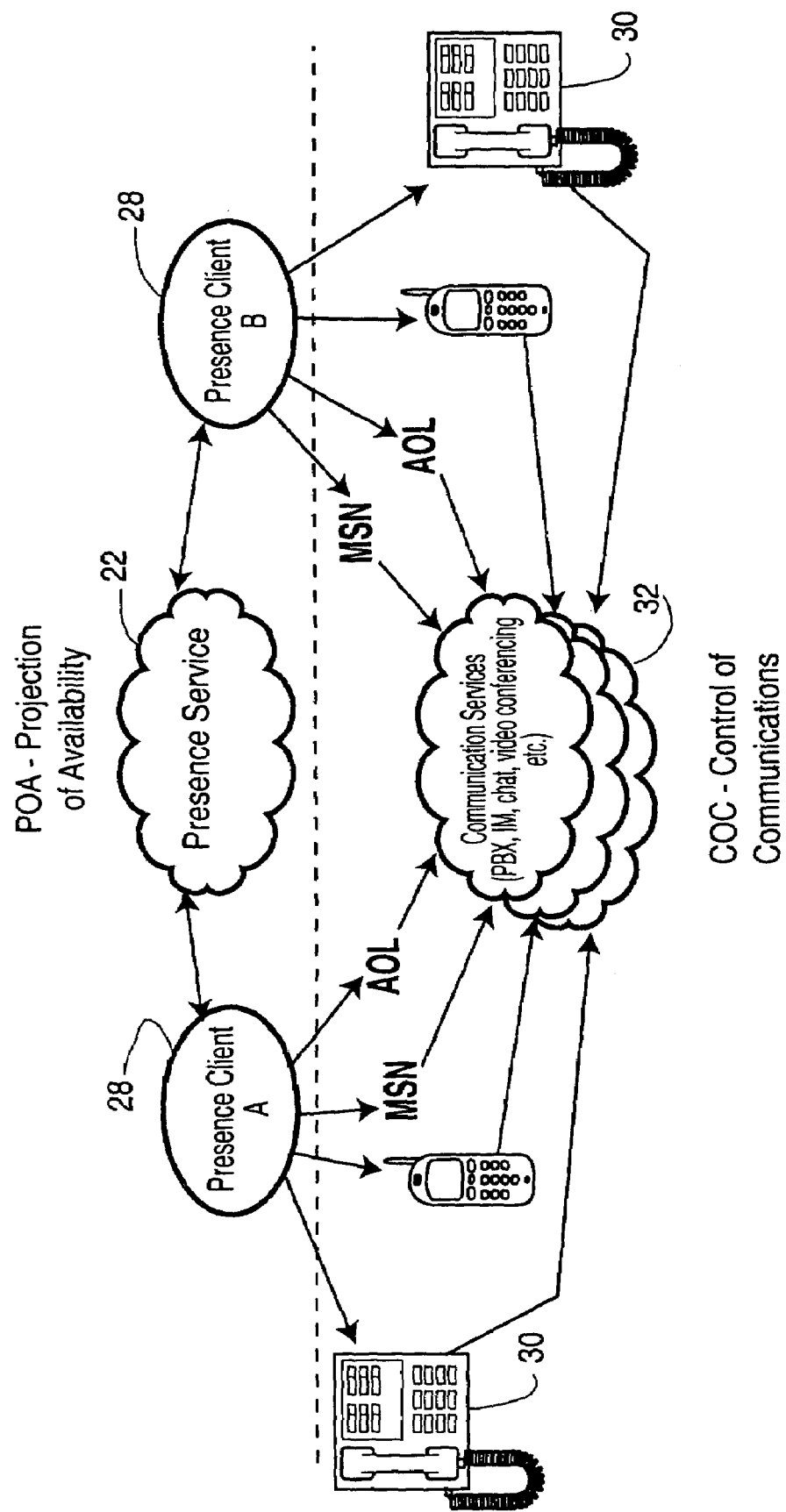
FIG. 2 is a diagram showing separation of Projection of Availability (POA) information from Control of Communications (COC) information according to the present invention.

With reference to FIG. 2, after the availability information is projected, the communications contact information can be used by the presence clients 28 for establishing the communications path. Thus, the projection of availability (POA) can be de-coupled from control of communications (COC) information. The presence service on the presence server 22 is operable to manage a user's availability and willingness to communicate while control of communications is managed by the communication services 32.

The service contact information in the availability message provides the link between the presence server 22 and communication services 32. The presence client 28 initiates the communication in one of two ways. The communication is initiated using a known interface protocol to the communication services 32 or the presence client 28 launches the communication application using a known set of parameters if no interface protocol is provided. Thus, the use of third party communication applications that can not be integrated with a presence client 28 is enabled.

Using both of these approaches, the presence client 28 employs a "mapping" that allows the presence client 28 to launch the appropriate helper application and/or objects, as described in greater detail below. This includes performing two checks prior to displaying the contact information of the presentity to the user. These checks include checking the service lookup table in order to determine if it supports the particular communication service and determining if the presentity's domain information in the service_url is accessible from the user's domain. The check to determine if presentity's contact address is accessible is based on the address-family. For an IP domain name for example, the presence client can check the domain name server (DNS) to ensure that the domain name can be mapped to an IP address. For E164 telephony addresses, this is done by using the phone-context argument that specifies the context that the telephony address is valid for.

For example, when a client receives a service:telephone:tel contact from a presence notification event it checks to see if it supports that particular service. An example of an object that supports the telephone service is presented below.

```
/**
 * Simple desktop telephone service component for a Mitel ICP client.
 */
public class E164TelService implements Runnable {
    private String resource_profile = null;
    private String serviceURL = null;
    private String resource_id = null;
    private Thread phone_monitor = null;
    private ServerSocket socket = null;
    private boolean alive = false;
    private boolean active = false;
    private BasicClient client = null;
}
```

This basic E164TelService service class also needs to implement an instantiation method and connect method. An example of these are presented below.

```
/**
 * DesktopClient constructor.
 */
public TelephonyResource(String serviceURL, String resource_id, BasicClient client) {
    setServiceURL(serviceURL);
    setResourceId(resource_id);
    this.client = client;
}
/** Connect: This particular client uses MITAI connections */
public void connect(String serviceURL) throws UnknownHostException, IOException {
    MITAIConnection connection = new MITAIConnection(getMitaiHost( ),
        getMitaiSocket( ), Integer.parseInt(getMyExtension( )));
    connection.makeCall(Integer.parseInt(getExtension(serviceURL)));
}
```

The service look-up table is similar to the look-up table used for Web browsers. A relationship file specifies a mapping between the contact service URL and the application that can service that URL. The service-access-info component of the service URL is specified by the service look-up table and an optional url-path is not required. The following is an exemplary format for the service look-up table.

table-service-access-info comm-interface
table-service-access-info="service:" service-type ":" "/"
    address-family '/' comm-interface=protocol-API| executable-file
protocol-API=Any alphanumeric name
executable-file=Any alphanumeric name+".exe"

For the telephony example above the entry in the lookup table would appear in the following manner.
    service:telephony:tel/E164/E164TelService The example above was particular to the case where a protocol API is available. In some situations a communication client can be launched for the user. Information regarding which client application to launch is required for communication using an AOL IM client, for example. This information is specified in the lookup table by referencing an executable rather than a module. For example:
    service:chat:IRC//kanata.mitel.com IRCChat.exe
    service:IM:ICQ//uin@icq.aol.comAOL.exe The first example shown demonstrated the specification of using the Mitel MiTAI APIs to service the tel protocol by the presence client 28. The final look up table examples show that the ICQ service is better managed using an executable file named "AOL.exe". Thus, in this example, the presence client launches that particular application with the address contact information as a parameter.

Figure 3:
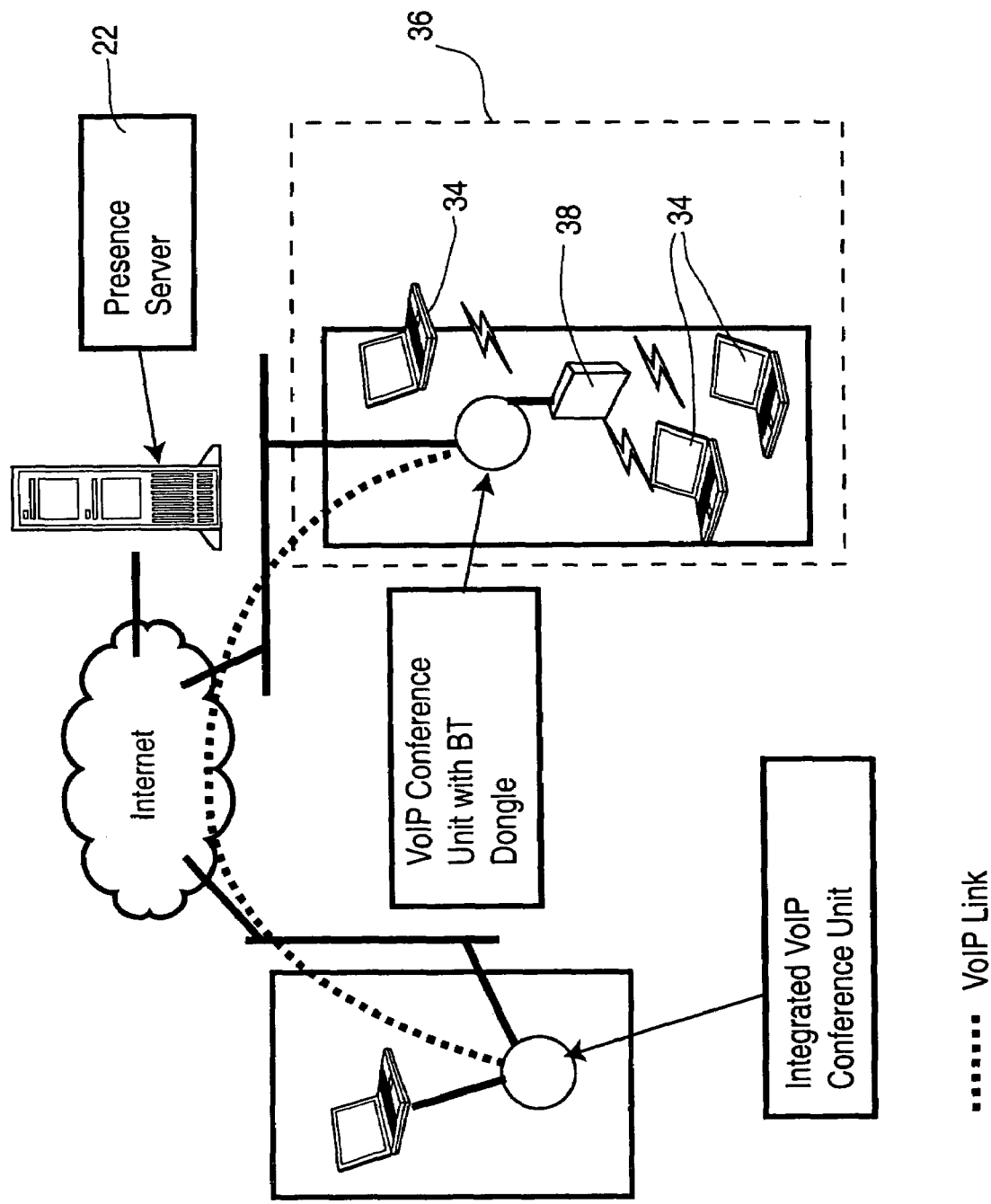
FIG. 3 is a representation of an application of the invention for facilitating ad hoc collaboration.
Figure 4:
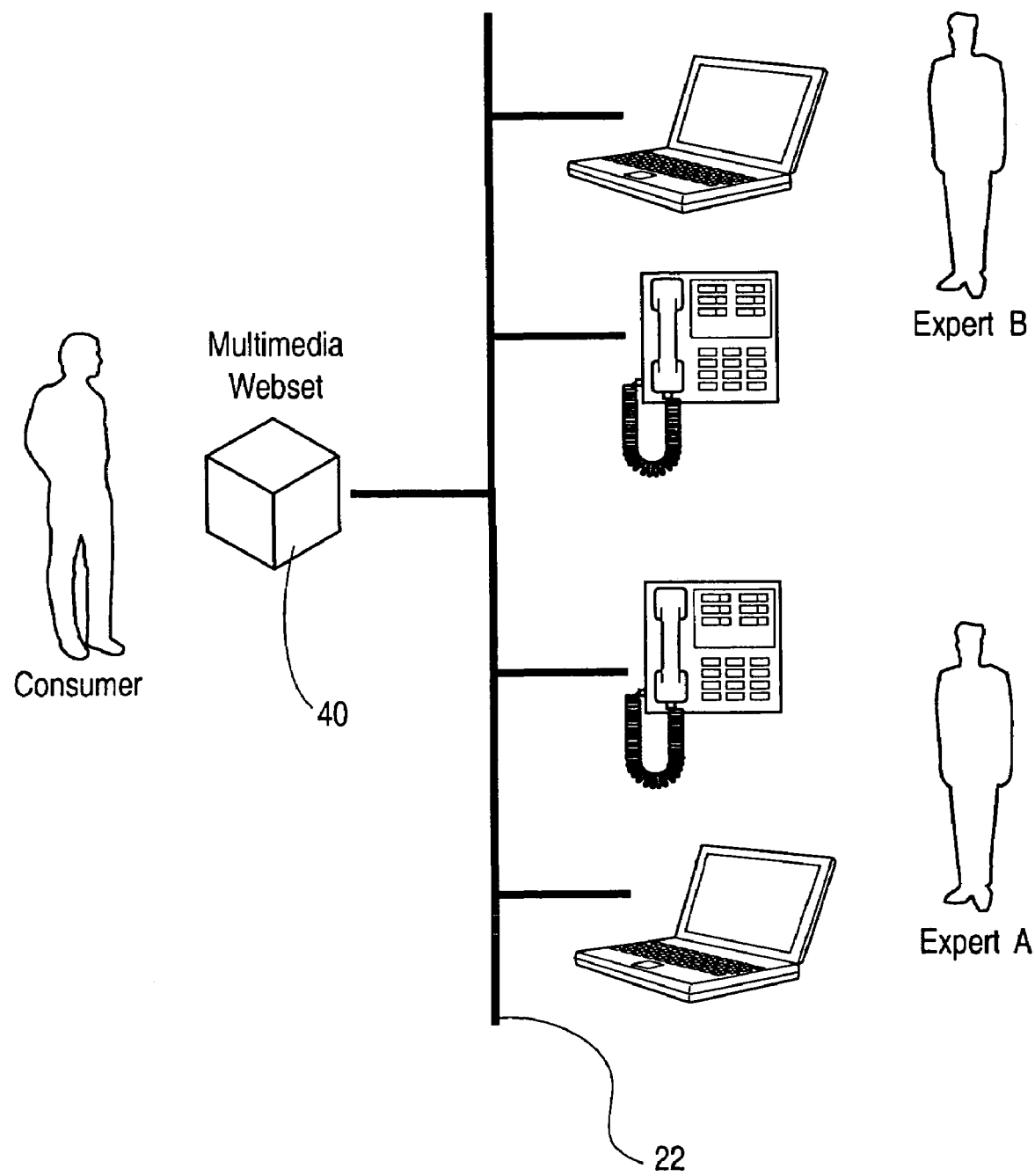
FIG. 4 is a representation of another application of the invention to contacting experts in a retail environment.

A more complete understanding of the invention can be obtained by reference to the examples of FIGS. 3 and 4, which show uses of the system for making a presence server aware of communication services. These examples are provided solely for purposes of illustration and are not intended to limit the scope of the invention.

Referring to FIG. 3, several users are shown for the purpose of setting up a conference call and these users desire access to other communication services in an ad hoc fashion. Automatic registration of the users' portable computers 34 is performed by creating a personal area network 36 with a base station 38 that acts as a telephone conference unit.

In operation, the users first register on to the presence service running on the presence server that is accessible to all the members of the conference call. The procedure of registering creates presence agents and sets the user profile that includes contact service information. Typical contact URLs that are shared among the members of the conference call allow them to commence chat, presentation sharing, and/or video sessions among themselves.

Reference is now made to FIG. 4, which shows an application of the invention to a retail environment having a number of experts. This example leverages the use of roles for finding experts that is discussed in greater detail in applicant's co-pending application filed on the same day as this application and entitled "Role-Based Presence Enabled Service for Communication System". An expert registers with the presence service on the presence server 22 for a particular role that reflects the expert's area of expertise. Through this action he/she thereby becomes available to potential customers in a retail store via multimedia communication devices 40, such as a Mitel® Webset™ device. Typical service URLs that can be projected to the Webset device allow for local telephony communications and sharing of product images.

Variations and modifications of the invention are possible. For example, All such modifications and variations are within the sphere and scope of the present invention as defined by the appended claims.

The invention claimed is:

1. A method for facilitating communication with a user, the method comprising the steps of:
    receiving contact information for said user, from a presence service, said contact information comprising a contact address of the user;
    checking to determine if a particular communication service is supported by said user said particular communication service associated with said contact address;
    checking to determine if the contact address of the user is accessible;

launching at least one of a helper application that assists with said particular communication service and an object that supports said particular communication service, in response to said contact address of the user being accessible; and initiating communication with the user through the particular communication service.

2. A method as claimed in claim 1, wherein said step of checking to determine if a particular communication service is supported comprises checking a service look-up table.

3. A method as claimed in claim 2, wherein said step of checking said service look-up table includes determining if domain information in a service url of the user is accessible.

4. A method as claimed in claim 2, wherein said step of checking to determine if the contact address of the user is accessible is based on an address-family of the user.

5. A method as claimed in claim 2 further comprising the step of receiving availability information of the user from a presence service, prior to the step of receiving contact information.

6. A method as claimed in claim 2 further comprising the step of projecting availability information to the presence service, prior to the step of receiving availability information of the user.

7. A method as claimed in claim 3, wherein said step of checking to determine if the contact address of the user is accessible is based on an address-family of the user.

8. A method as claimed in claim 3 further comprising the step of receiving availability information of the user from a presence service, prior to the step of receiving contact information.

9. A method as claimed in claim 3 further comprising the step of projecting availability information to the presence service, prior to the step of receiving availability information of the user.

10. A method as claimed in claim 1, wherein said step of checking to determine if the contact address of the user is accessible is based on an address-family of the user.

11. A method as claimed in claim 10 further comprising the step of receiving availability information of the user from a presence service, prior to the step of receiving contact information.

12. A method as claimed in claim 10 further comprising the step of projecting availability information to the presence service, prior to the step of receiving availability information of the user.

13. A method as claimed in claim 1 further comprising the step of receiving availability information of the user from said presence service, prior to the step of receiving contact information.

14. A method as claimed in claim 13 further comprising the step of projecting availability information to the presence service, prior to the step of receiving availability information of the user.

15. A method as claimed in claim 1 further comprising the step of projecting availability information to the presence service, prior to the step of receiving availability information of the user.

16. A method for facilitating communication with a presentity, comprising the steps of:
   projecting a subscription request to a presence service for determining the availability of the presentity;
   receiving a notification message from the presence service in response to said subscription request, said notification message comprising a role tags for identifying a role that the presentity is in and a key tag for identifying the availability of the presentity for the subscription request;
   receiving a notification of availability of the presentity if said role tag is indicative that the presentity is in a role where notifications of availability may be received, and said key tag is indicative that the presentity is available for the subscription request; and,
   responsive to said notification of availability being indicative of the presentity being available,
   checking to determine if a particular communication service is supported by the presentity;
   checking network accessibility of the presentity;
   launching at least one of a helper application that assists with said particular communication service and an object that supports said particular communication service, in response to said network accessibility of the presentity being accessible; and
   initiating communication with the presentity through the particular communication service.

17. A method as claimed in claim 16, wherein said step of checking to determine if a particular communication service is supported comprises checking a service look-up table.

18. A method as claimed in claim 17, wherein said step of checking said service look-up table includes determining if domain information of the presentity is accessible.

19. A method as claimed in claim 17, wherein the step of checking network accessibility of the presentity is based on an address-family of the user.

20. A method as claimed in claim 17 further comprising the step of projecting availability information to the presence service, prior to the step of projecting a subscription request.

21. A method as claimed in claim 18, wherein the step of checking network accessibility of the presentity is based on an address-family of the user.

22. A method as claimed in claim 18 further comprising the step of projecting availability information to the presence service, prior to the step of projecting a subscription request.

23. A method as claimed in claim 16, wherein the step of checking to determine if the contact address of the presentity is accessible is based on an address-family of the user.

24. A method as claimed in claim 23 further comprising the step of projecting availability information to the presence service, prior to the step of projecting a subscription request.

25. A method as claimed in claim 16 further comprising the step of projecting availability information to the presence service, prior to the step of projecting a subscription request.

26. A system for facilitating communication with a presentity, comprising:
   a presentity presence client;
   a watcher presence client for projecting a subscription request;
   a presence server connected to the presentity presence client and the watcher presence client, said presence server for receiving the subscription request and for replying to said watcher presence client to identify the availability of the presentity for the subscription request; and
   a communication service separate from said presence server and connected to said watcher presence client and said presentity presence client,
   wherein said watcher presence client is operable to launch at least one of an helper application that assists with said particular communication service and an object that supports said particular communication service, said watcher presence client further operable to initiate communication with the presentity through the particular communication service.

27. A system for initiating communication as claimed in claim 26 wherein said presentity comprises a presentity resource.

28. A system for initiating communication as claimed in claim 26, wherein said presence server comprises a directory service for storing a data record in association with a plurality of users.

29. A system for initiating communication as claimed in claim 28, wherein said presence server further comprises a user agent for maintaining information about the availability of the presentity, said presence server enabled to determine if the presentity is available.

* * * * *